(12) United States Patent
Bayer et al.

(10) Patent No.: US 9,445,140 B2
(45) Date of Patent: *Sep. 13, 2016

(54) SYSTEMS AND METHODS FOR SHARING VIDEO VIEWING HISTORY

(71) Applicant: GOOGLE INC., Mountain View, CA (US)

(72) Inventors: Jason Bayer, Mountain View, CA (US); Nathan Leslie Sandland, Mountain View, CA (US)

(73) Assignee: GOOGLE INC., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/597,927

(22) Filed: Jan. 15, 2015

(65) Prior Publication Data

US 2015/0163530 A1 Jun. 11, 2015

Related U.S. Application Data

(63) Continuation of application No. 13/556,085, filed on Jul. 23, 2012, now Pat. No. 8,949,873.

(60) Provisional application No. 61/513,632, filed on Jul. 31, 2011.

(51) Int. Cl.
| | |
|---|---|
| H04N 7/16 | (2011.01) |
| H04H 60/33 | (2008.01) |
| H04N 7/10 | (2006.01) |
| H04N 7/025 | (2006.01) |
| H04N 7/173 | (2011.01) |
| H04N 21/258 | (2011.01) |
| H04H 60/31 | (2008.01) |
| H04H 60/80 | (2008.01) |
| H04N 21/442 | (2011.01) |
| H04N 21/443 | (2011.01) |

(52) U.S. Cl.
CPC ........ *H04N 21/25891* (2013.01); *H04H 60/31* (2013.01); *H04H 60/80* (2013.01); *H04N 21/443* (2013.01); *H04N 21/44222* (2013.01); *H04N 21/44236* (2013.01)

(58) Field of Classification Search
None
See application file for complete search history.

(56) References Cited

U.S. PATENT DOCUMENTS

| | | | |
|---|---|---|---|
| 6,177,931 B1 | 1/2001 | Alexander et al. | |
| 7,904,924 B1 | 3/2011 | de Heer et al. | |
| 2003/0126600 A1 | 7/2003 | Heuvelman | |
| 2004/0073918 A1 | 4/2004 | Ferman et al. | |
| 2004/0181818 A1 | 9/2004 | Heyner et al. | |
| 2007/0157247 A1 | 7/2007 | Cordray et al. | |
| 2007/0219985 A1 | 9/2007 | Aravamudan et al. | |
| 2008/0301166 A1 | 12/2008 | Sugiyama et al. | |
| 2010/0005492 A1 | 1/2010 | Takano et al. | |
| 2011/0078724 A1 | 3/2011 | Mehta et al. | |
| 2012/0159337 A1 | 6/2012 | Travilla et al. | |

*Primary Examiner* — Nathan Flynn
*Assistant Examiner* — William J Kim
(74) *Attorney, Agent, or Firm* — Morgan, Lewis & Bockius LLP (57) ABSTRACT

A method for storing user activity data is disclosed. The method includes receiving user activity data from the multiple computer programs, and identifying a subset of the user activity data in accordance with storage criteria associated with the multiple computer programs. The method also includes storing in a user activity database the subset of the user activity data identified in accordance with the storage criteria associated with the multiple computer programs, and displaying the subset of the user activity data stored in the user activity database.

20 Claims, 7 Drawing Sheets

SYSTEMS AND METHODS FOR SHARING VIDEO VIEWING HISTORY

RELATED APPLICATION

This application is a continuation of U.S. application Ser. No. 13/556,085, filed Jul. 23, 2012, entitled "Systems and Methods for Sharing Media Content Viewing History," which claims priority to U.S. Provisional Application Ser. No. 61/513,632, filed Jul. 31, 2011, entitled "Systems and Methods for Sharing Video Viewing History," which are incorporated by reference herein in their entirety.

TECHNICAL FIELD

The disclosed implementations relate generally to sharing video viewing history. More particularly, the disclosed implementations relate to methods and systems for sharing video viewing history based on user preferences.

BACKGROUND

Television devices (e.g., televisions and receivers coupled to televisions) have been traditionally used to access various television programs. Increasingly, multi-media devices are used for accessing television programs as well as other multimedia contents and information from websites. Multimedia devices typically integrate television devices and computer systems.

Multimedia devices are typically configured to execute multiple software applications. However, many software applications are not configured to share user activity data (e.g., user history) with other software applications. Furthermore, sharing user activity data with the multiple software applications requires careful considerations, including consideration of privacy concerns.

SUMMARY

A number of implementations (e.g., of computer systems or devices, and methods of operating such systems or devices) that overcome the limitations and disadvantages described above are presented in more detail below. These implementations provide methods, systems, and graphical user interfaces (GUIs) for sharing video viewing history.

As described in more detail below, some implementations involve a method for managing user activity data. The method is performed at a computer system coupled with a television device. The computer system includes one or more processors and memory storing multiple computer programs, for execution by the one or more processors, for displaying content on the television device. The method includes receiving user activity data from the multiple computer programs, and identifying a subset of the user activity data in accordance with storage criteria associated with the multiple computer programs. The method also includes storing in a user activity database the subset of the user activity data identified in accordance with the storage criteria associated with the multiple computer programs, and displaying the subset of the user activity data stored in the user activity database.

In accordance with some implementations, a computer system coupled with a television device includes one or more processors, and memory storing multiple computer programs, for execution by the one or more processors, for displaying content on the television device. The memory includes instructions for receiving user activity data from the multiple computer programs, and identifying a subset of the user activity data in accordance with storage criteria associated with the multiple computer programs. The memory also includes instructions for storing in a user activity database the subset of the user activity data identified in accordance with the storage criteria associated with the multiple computer programs, and displaying the subset of the user activity data stored in the user activity database.

In accordance with some implementations, a non-transitory computer readable storage medium stores multiple computer programs, for execution by one or more processors of a computer system coupled with a television device, for displaying content on the television device. The non-transitory computer readable storage medium stores instructions for receiving user activity data from the multiple computer programs, and identifying a subset of the user activity data in accordance with storage criteria associated with the multiple computer programs. The non-transitory computer readable storage medium also stores instructions for storing in a user activity database the subset of the user activity data identified in accordance with the storage criteria associated with the multiple computer programs, and displaying the subset of the user activity data stored in the user activity database.

Thus, computer systems coupled with devices are provided with improved methods for managing user activity data. The user activity data can be shared among multiple application programs in accordance with user preferences, thereby enabling application programs to provide information based on user activity data while protecting the user privacy.

BRIEF DESCRIPTION OF THE DRAWINGS

For a better understanding of the aforementioned implementations as well as additional aspects and implementations thereof, reference should be made to the Description of Implementations below, in conjunction with the following drawings in which like reference numerals refer to corresponding parts throughout the figures.

Like reference numerals refer to corresponding parts throughout the drawings.

DETAILED DESCRIPTION

Methods and systems for managing user activity data are described. Reference will be made to certain implementations, examples of which are illustrated in the accompanying drawings. While the invention will be described in conjunction with the implementations, it will be understood that the implementations are not intended to limit the invention to these particular implementations alone.

Moreover, in the following description, numerous specific details are set forth to provide a thorough understanding of the described implementations. However, it will be apparent to one of ordinary skill in the art that some implementations may be practiced without these particular details. In other instances, methods, procedures, components, and networks that are well-known to those of ordinary skill in the art are not described in detail to avoid obscuring aspects of the implementations described in this document.

Figure 1:
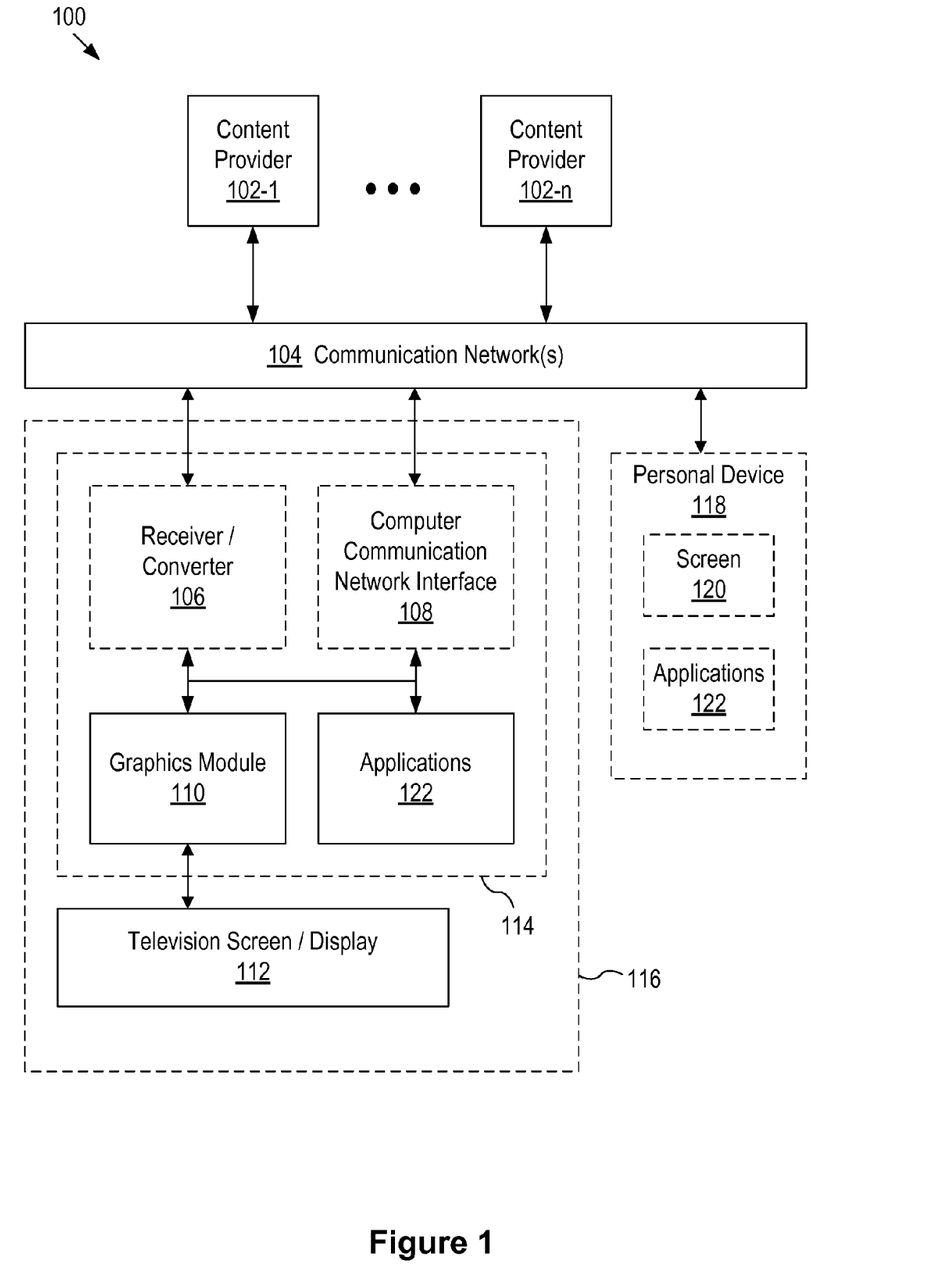
FIG. 1 is a block diagram illustrating an exemplary content distribution system, in accordance with some implementations.

FIG. 1 is a block diagram illustrating an exemplary content distribution system 100, according to certain implementations. In FIG. 1, the system 100 includes one or more content providers 102 and communications networks 104. Connected to the communication networks 104 is a companion device 114 coupled with a television screen 112 or an integrated television device 116 that includes the television screen 112 and components of the companion device 114. In some implementations, the companion device 114 is a set-top box or is a computing device that includes set-top box functionality. Various implementations of the companion device 114 and/or the integrated television device 116 implement the methods described in this document.

As used herein, content providers 102 are systems or devices configured to provide media content (e.g., music, television programs, movies, social media data, web data, etc.). The content providers 102 can be any of a number of content provider systems, equipment, and/or devices that provide media content (e.g., radio broadcasting systems, on-air television broadcasting systems, cable service systems, direct satellite broadcasting systems, Internet television service servers, Internet radio station servers, web servers, digital video recorders, etc.). In some implementations, at least a subset of the media contents distributed by the content providers 102 includes audio data (e.g., music, radio programs, television programs, movies, etc.). In some implementations, at least a subset of the media contents distributed by the content providers 102 includes video data (e.g., photos, television programs, movies, etc.). In some implementations, at least a subset of the media contents distributed by the content providers 102 includes multimedia data (e.g., television programs, movies, etc.). In some implementations, at least a subset of the media contents distributed by the content providers 102 includes user-readable text (e.g., messages sent via short message services, postings on blogs or other social networking media, web pages, etc.).

The content providers 102 distribute media contents via the communication networks 104. The communication networks 104 may include one or more of: radio-frequency communication networks used for on-air or satellite television broadcasting, radio-frequency communication networks used for on-air radio broadcasting, cable-based communication networks, digital audio/video communication networks, the Internet, other wide area networks, local area networks, metropolitan area networks, wireless networks, cellular networks, and so on.

In some implementations, the companion device 114 or the integrated television device 116 includes a receiver/converter 106 connected to the communication networks 104 and configured to receive audio and/or video signals, typically via one or more of radio-frequency communication networks and/or one or more digital audio/video communication networks.

In some implementations, the companion device 114 or the integrated television device 116 includes one or more computer communication network interfaces 108 that are configured for interfacing with one or more computer communication networks, such as the Internet, other wide area networks, local area networks, metropolitan area networks, wireless networks, cellular networks, and so on.

The companion device 114 or the integrated television device 116 stores and/or executes applications 122. The applications 122 include application programs used for managing the companion device 114 or the integrated television device 116, including, in some implementations, applications for controlling the display on the television screen of media content from one or more of the content providers 102. For example, at least one of the applications 122 is configured to receive data from the receiver/converter 106 and/or the computer communication network interface 108 and send data and instructions to a graphics module 110 for rendering media and program content, including user interfaces and/or user interface objects. In some implementations, the applications 122 include web browsers and one or more media players, such as a television player and a movie player.

The graphics module 110 includes one or more display processors or graphics processing units for rendering user interfaces and/or user interface objects. In some implementations, the graphics module 110 receives data from the receiver/converter 106 and/or the computer communication network interface 108, and additional data or instructions from the applications 122 for rendering user interfaces and/or user interface objects. The user interfaces and/or user interface objects rendered by the graphics module 110 are sent to the television screen 112 for display.

The companion device 114 or the integrated television device 116 may include additional components not illustrated in FIG. 1.

Also illustrated in FIG. 1 is a personal device 118. The personal device 118 may be any of a number of computing devices (e.g., Internet kiosk, personal digital assistant, cell phone, smart phone, gaming device, desktop computer, laptop computer, tablet computer, handheld computer, or combinations thereof) used to enable the activities described below. The personal device 118 includes a display screen 112 where a graphical user interface (GUI) can be displayed. In some implementations, the personal device 118 is also configured to receive media content from the content providers 102 via the communication networks 104, and display the received media content.

In some implementations, the applications 122 can be executed on either or both a personal device 118 or a companion device 114, in which case the application output, including user interface elements, is presented on either the television screen 112 or the personal device screen 120. For example, an application can be an Android application that can be executed on a companion device 114 (such as a Google TV-enabled set-top box) and a smart phone/personal device 118 (such as an Android phone).

Figure 2:
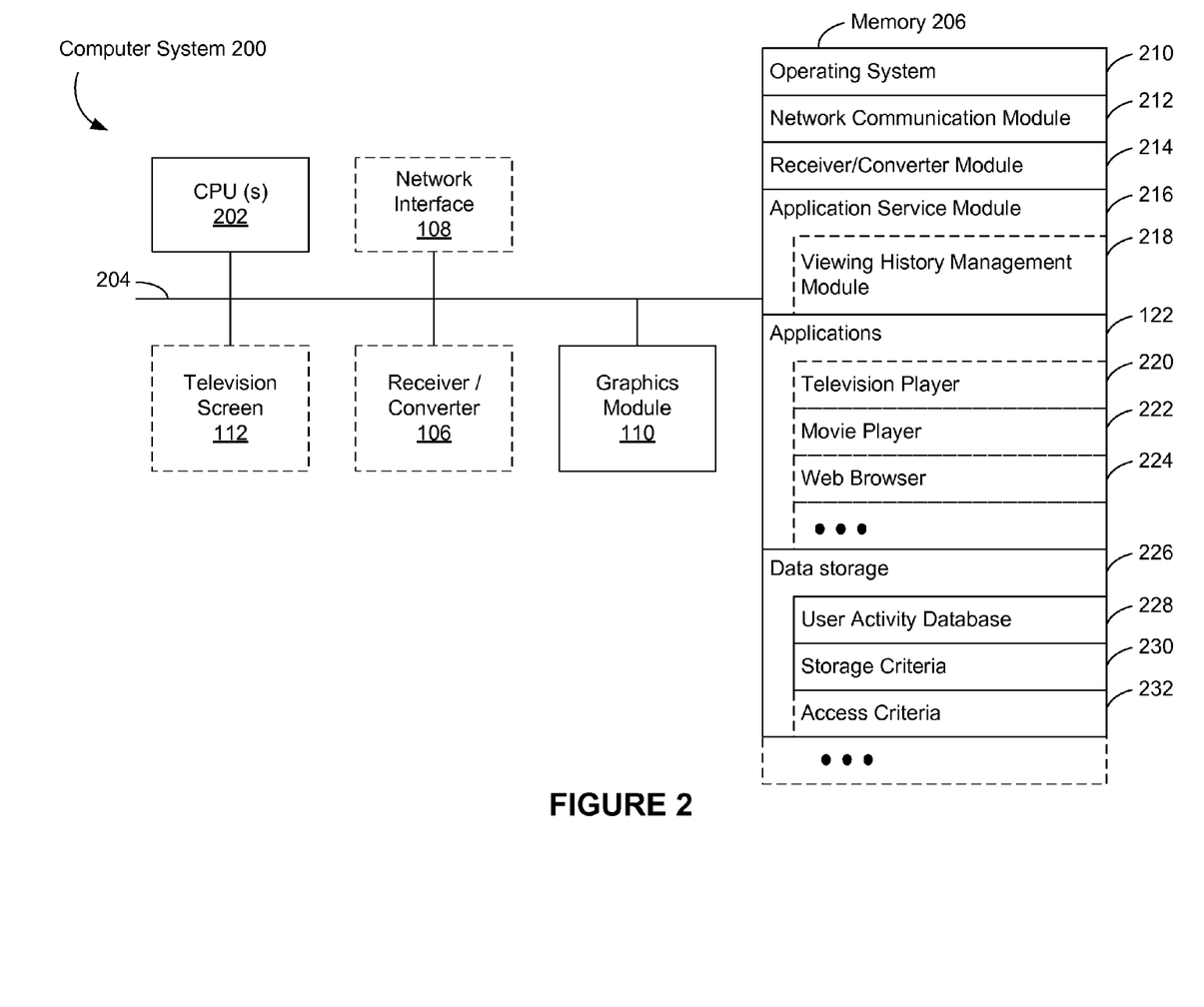
FIG. 2 is a block diagram illustrating a computer system, in accordance with some implementations.

FIG. 2 is a block diagram illustrating a computer system 200 in accordance with some implementations. In some implementations, the computer system 200 corresponds to the companion device 114 or the integrated television device 116 (FIG. 1).

The computer system 200 typically includes one or more processing units (CPUs) 202, graphics module 110, and memory 206. In some implementations, the computer system 200 also includes one or more of: one or more network or other communications interfaces 108, and one or more receivers and/or converters 106. The computer system 200 includes one or more communication buses 204 for interconnecting these components. In some implementations, the communication buses 204 include circuitry (sometimes called a chipset) that interconnects and controls communications between system components. In some other implementations, the computer system 200 includes a user interface (not shown) (e.g., a keyboard, and a mouse or other pointing device). The computer system 200 is coupled with the television screen 112, regardless of whether the television screen 112 is integrated with the computer system 200 or located outside the computer system 200. The television screen 112 may be used to display a graphical user interface.

The memory 206 of the computer system 200 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 206 may optionally include one or more storage devices remotely located from the CPU(s) 202. The memory 206, or alternately the non-volatile memory device(s) within the memory 206, comprises a non-transitory computer readable storage medium. In some implementations, the memory 206 or the computer readable storage medium of the memory 206 stores the following programs, modules and data structures, or a subset thereof:

- operating system 210 that includes procedures for handling various basic system services and for performing hardware dependent tasks;
- network communication module (or instructions) 212 that is used for connecting the computer system 200 to the content providers (e.g., content providers 102, FIG. 1) via one or more network interfaces 108 and one or more communications networks 104 (FIG. 1), such as the Internet, other wide area networks, local area networks, metropolitan area networks, wireless networks, cellular networks, and so on;
- receiver/converter module (or instructions) 214 that is used for receiving media content from the content providers (e.g., content providers 102) via one or more receivers/converters 106 and one or more communications networks 104, such as radio-frequency audio/video communication networks, cable-based communication networks, digital audio/video communication networks, and so on;
- application service module 216 that provides various services to the applications 122;
- applications 122 that include various applications executed by the one or more processing units 202 causing the computer system 200 to perform certain operations (e.g., a television player 220, which, when executed, displays contents of one or more television programs; a movie player 222, which, when executed, displays contents of one or more movie programs; a web browser 224; an email application (not shown), which, when executed, displays one or more email messages; etc.), and
- data storage 226 that stores various data used by the computer system 200.

The data storage 226 typically includes user activity database 228 that includes selected information about user interaction with the computer system 200 or the television screen 112 (e.g., user viewing history). In some implementations, the user activity database 228 includes a "unified history" of user activity. For example, the unified history of user activity includes the history of user activity associated with multiple applications (e.g., the television player 220, the movie player 222, and the web browser 224, etc.), not just with one application. In some implementations, the unified history is used by a user to repeat one of the previously performed user activity. In some implementations, the unified history is used for making predictions of the user's viewing interest. The user activity database 228 is described in detail with respect to FIG. 3C. In some implementations, the user activity database 228 is stored in one or more servers located remotely from the computer system 200. In some implementations, the one or more servers are secure data servers configured to prevent unauthorized access to the stored data.

The data storage 226 also includes storage criteria 230 that are used to identify user activity data that may be stored in the user activity database 228. The storage criteria 230 are described in detail with respect to FIG. 3A.

In some implementations, the data storage 226 includes access criteria 232 that are used to identify user activity data that may be accessed by a respective application 122. The access criteria 232 are described in detail with respect to FIG. 3B.

The application service module 216 includes one or more service modules to provide various application services (e.g., memory management, data management, graphics rendering, etc.) to the applications 122. In some implementations, the application service module 216 is included in the operating system 210. In some implementations, the application service module 216 includes a viewing history management module 218 for managing the user activity database 228. In some implementations, the application service module 216 includes a rendering service module for sending data and/or instructions to the graphics module 110 for rendering user interfaces and/or user interface objects.

Optionally, the memory 206 may include additional applications, modules, or components. In some implementations, the computer system 200 includes additional components not illustrated in FIG. 2. For example, the computer system 200 may include one or more audio modules for generating and/or amplifying audio signals. The computer system 200 may also include one or more security modules for protecting the data stored in the computer system 200.

Each of the above identified modules and applications corresponds to a set of instructions for performing one or more functions described above. These modules (i.e., sets of instructions) need not be implemented as separate software programs, procedures or modules, and thus various subsets of these modules may be combined or otherwise re-arranged in various implementations. In some implementations, the memory 206 may store a subset of the modules and data structures identified above. Furthermore, the memory 206 may store additional modules and data structures not described above.

Notwithstanding the discrete blocks in FIGS. 1 and 2, these figures are intended to provide functional descriptions of some implementations rather than structural descriptions of functional elements in the implementations. One of ordinary skill in the art will recognize that an actual implementation might have the functional elements grouped or split among various components. In practice, and as recognized by those of ordinary skill in the art, items shown separately could be combined and some items could be separated. For example, in some implementations, the television screen 112 is included in the computer system 200. In other implementations, the television screen 112 is physically separated from the computer system 200. In some implementations, the CPUs 202 and the memory 206 are included in a single semiconductor package. In some implementations, the CPUs 202 and the graphics module 110 are included in a single semiconductor package. In some implementations, the computer system 200 is implemented on multiple distributed computer systems. In some implementations, the viewing history management module 218 is integrated into the application service module 216, and the viewing history management module 218 may not exist as a separate module.

The actual number of components used to implement the computer system 200 and how features are allocated among them will vary from one implementation to another, and may depend in part on the amount of data traffic that the system must handle during peak usage periods as well as during average usage periods, and may also depend on the amount of data stored by the computer system 200. Moreover, one or more of the blocks (e.g., the television screen 112, and the receiver/converter 106, etc.) in FIGS. 1 and 2 may be implemented on one or more separate devices designed to provide the described functionality. Although the description herein refers to certain features implemented in the television device and the computer system 200, the implementations are not limited to such distinctions. For example, features described herein as being part of the computer system 200 can be implemented in whole or in part in the television device, and vice versa.

Figure 3A:
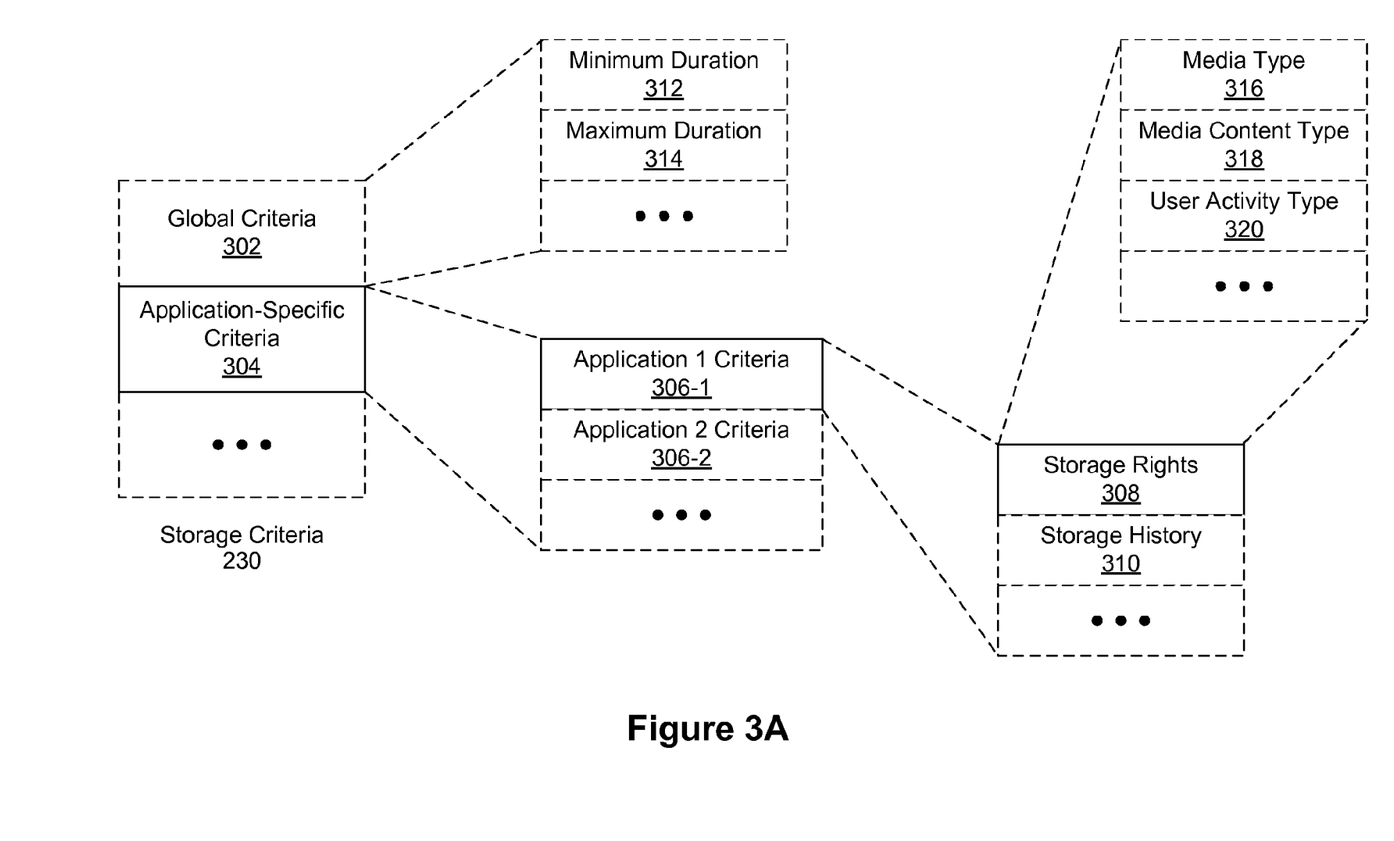
FIGS. 3A-3C are block diagrams illustrating exemplary data structures, in accordance with some implementations.

FIG. 3A is a block diagram illustrating an exemplary data structure for the storage criteria 230 (FIG. 2), in accordance with some implementations. Typically, criteria included in the storage criteria 230 may be set by a respective user. In some implementations, criteria included in the storage criteria 230 may include default criteria, which may be changed by the respective user. In some implementations, in order to protect privacy, the criteria in the storage criteria 230 may be set by default in a manner such that user activity data are not stored without explicit user permission (e.g., an opt-in by the respective user). For example, privacy settings may be customized by the user thereby allowing the user to define how many and which applications executed on the companion device 114 or the personal device 118 are authorized to write to or read from the unified history.

The storage criteria 230 include application-specific criteria 304. The application-specific criteria 304 include one or more application criteria 306 where each application criteria 306 corresponds to a single respective application (e.g., application 1 criteria 306-1 may correspond to the television player 220 and application 2 criteria 306-2 may correspond to the movie player 222, FIG. 2). Respective application criteria 306-1 include storage rights 308, which indicate whether a respective application (e.g., the television player 220) is authorized by a user to store user activity data. In some implementations, the storage rights 308 include one or more of:

- media type 316, which indicates one or more media types of user activity data that the respective application is authorized to store (e.g., the respective application may store television viewing history, but not music listening history);
- media content type 318 (e.g., the respective application may store viewing history related to sports and drama programs, but not news programs); and
- user activity type 320 (e.g., the respective application may store user search history, but not web browsing history).

In some implementations, the respective application criteria 306-1 also include storage history 310, which indicates timestamps of when the respective application stored user activity data. In some implementations, the storage history 310 is stored by the computer system 200 separately from the storage criteria 230.

In some implementations, the storage criteria 230 include global criteria 302, which are used for all applications that are configured to store user activity data. In some implementations, the global criteria 302 includes one or more of:

- minimum duration 312 for each user activity data; and
- maximum duration 314 for each user activity data.

For example, the computer system 200 may store user activity data that satisfy the minimum duration 312 (e.g., a corresponding user activity continued for at least the minimum duration) and/or the maximum duration 314 (e.g., the corresponding user activity did not continue for more than the maximum duration). In some implementations, the computer system 200 disregards any user activity data that do not satisfy the minimum duration 312 or the maximum duration 314.

In some cases, the minimum duration 312 and/or the maximum duration 314 are used to prevent storage of user activity data that is not useful for providing better personalized service. For example, user activity data that has duration less than the minimum duration 312 may indicate that the user is flipping channels. The channels that the user flips through are disregarded because they do not represent channels that the user is interested in. Conversely, user activity data that has duration more than the maximum duration 314 may indicate that the user is away from the television or is not watching the television screen, and thus, such user activity data are disregarded.

Figure 3B:
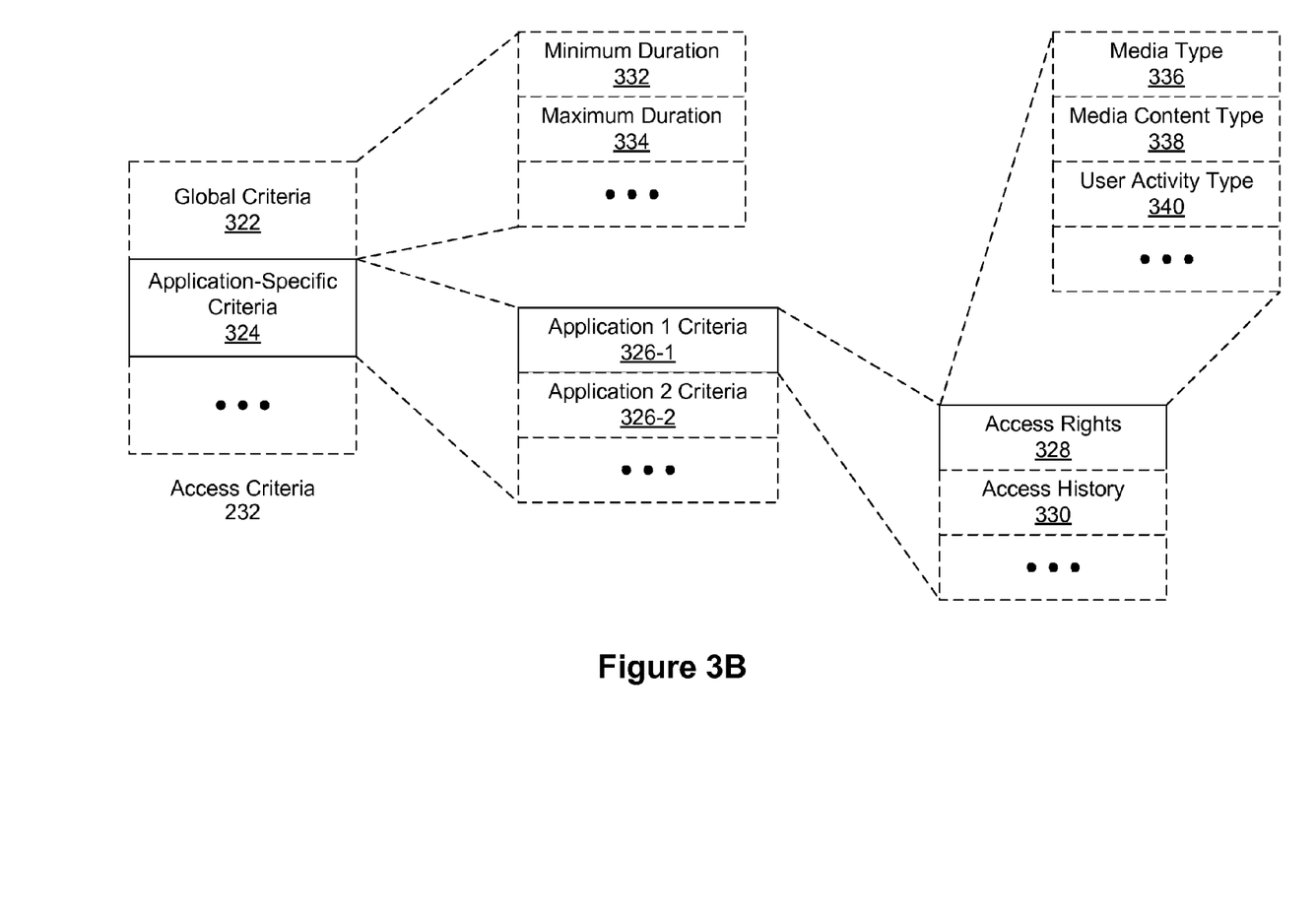

FIG. 3B is a block diagram illustrating an exemplary data structure for the access criteria 232 (FIG. 2), in accordance with some implementations. Similar to the storage criteria 230, criteria included in the access criteria 232 may be set by a respective user. In some implementations, criteria included in the access criteria 232 may include default criteria, which may be changed by the respective user. In some implementations, in order to protect privacy, the criteria in the access criteria 232 may be set by default in a manner such that user activity data are not shared without explicit user permission (e.g., an opt-in by the respective user).

The access criteria 232 include application-specific criteria 324. The application-specific criteria 324 include one or more application criteria 326. Each set of the application criteria 326 corresponds to a single respective application (e.g., application 1 criteria 326-1 may correspond to the television player 220 and application 2 criteria 326-2 may correspond to the movie player 222, FIG. 2). Respective application criteria 326-1 include access rights 328, which indicate whether a respective application (e.g., the television player 220) is authorized by a user to access user activity data stored in the user activity database 228. In some implementations, the access rights 328 include one or more of:

- media type 336, which indicates one or more media types of user activity data that the respective application is authorized to access (e.g., the respective application may access television viewing history, but not music listening history);
- media content type 338 (e.g., the respective application may access viewing history related to sports and drama programs, but not news programs); and
- user activity type 340 (e.g., the respective application may access user search history, but not web browsing history).

In some implementations, the respective application criteria 326-1 also include access history 330, which includes timestamps of when the respective application accessed the user activity database 228. In some implementations, the access history 330 is stored by the computer system 200 separately from the access criteria 232.

In some implementations, the access criteria 232 include global criteria 322, which are used for all applications that are configured to access user activity data. In some implementations, the global criteria 322 includes one or more of:

minimum duration 332 for each user activity data; and maximum duration 334 for each user activity data.

For example, the computer system 200 may access user activity data that satisfy the minimum duration 332 (e.g., a corresponding user activity continued for at least the minimum duration) and/or the maximum duration 334 (e.g., the corresponding user activity did not continue for more than the maximum duration). In some implementations, the computer system 200 disregards any user activity data that does not satisfy the minimum duration 332 or the maximum duration 334.

Figure 3C:
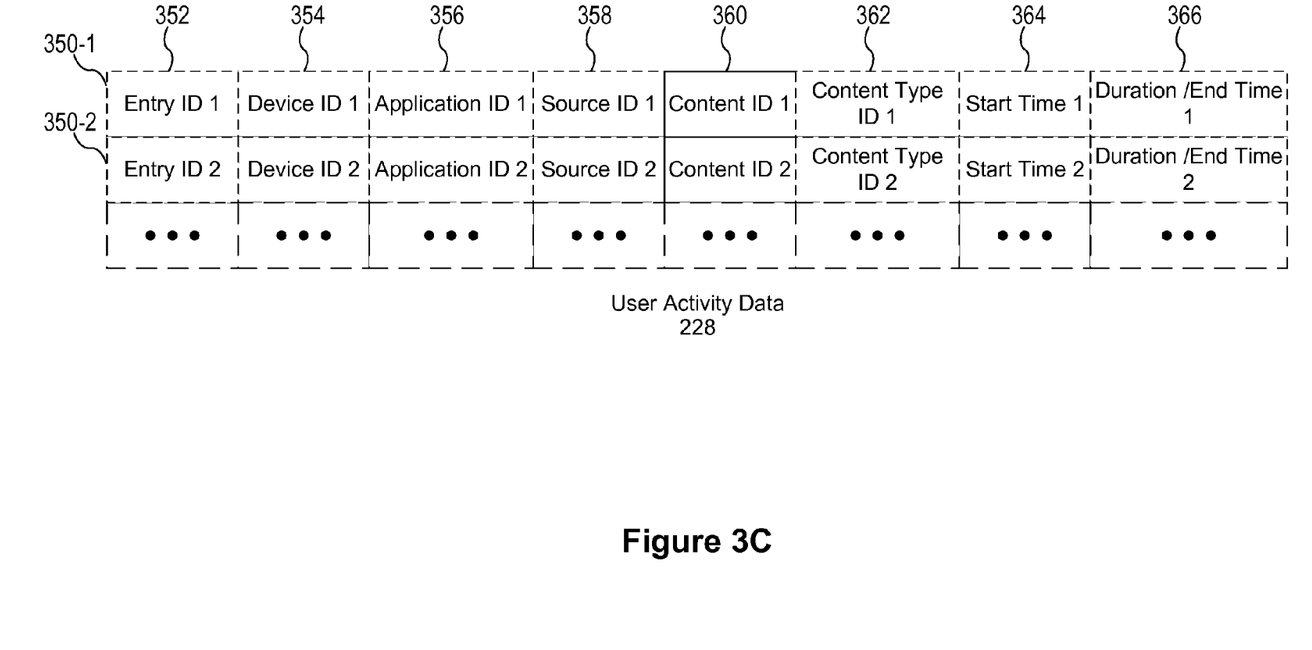

FIG. 3C is a block diagram illustrating an exemplary data structure for the user activity database 228 (FIG. 2), in accordance with some implementations. The user activity database 228 includes a plurality of user activity data entries 350 (e.g., the first user activity data entry 350-1, the second user activity data entry 350-2, etc.). Each user activity data entry 350 (e.g., a respective user activity data entry 350-1) typically includes two or more of:

entry identifier 352, which uniquely identifies the respective user activity data entry 350 (e.g., an alphanumeric, binary, or hexadecimal string);

device identifier 354, which uniquely identifies a device that has provided the respective user activity data entry 350 (e.g., the computer system 200);

application identifier 358, which uniquely identifies an application 122 (FIG. 1) that has generated the respective user activity data entry 350 (e.g., the television player 220, the movie player 222, or the web browser 224);

source identifier 356, which uniquely identifies a source of the media content viewed by the user in the corresponding user activity (e.g., a unique identifier of the content provider 102, a television channel, an Internet protocol address of a website, etc.);

content identifier 360, which uniquely identifies the media content viewed by the user in the corresponding user activity (e.g., a universal resource locator (URL) of a web page, a content title, etc.);

content type identifier 362, which identifies a type of the media content (e.g., PG-rated family movie, family drama, action, romance, etc.) viewed by the user in the corresponding user activity;

start time 364, which includes a timestamp of when the corresponding user activity started (e.g., by turning on the television, changing the channels, starting a movie player, etc.); and duration and/or end time 366, which includes either a duration of the corresponding user activity or a timestamp of when the corresponding user activity ended (e.g., by turning off the television, changing the channels, closing the movie player, etc.).

Each user activity data entry 350 may include additional information not shown in FIG. 3C.

Using the storage criteria 230 and the access criteria 232, the viewing history management module 218 can allow a set of applications 122 running on the companion device 114 or the personal device 118 to write viewing history information into the same viewing history data structure (called herein "the unified history") 228, and, conversely, can allow the same or a different set of applications 112 (including no applications) to read from the same viewing history data structure. This will enable media applications (e.g., the television player 220, the movie player 222, etc.) that try to predict what show a user would like to view to better reflect all of the user's interests related to media content. This is because such unified history will potentially reflect all of the user's viewing activity, such as consumption of traditional media content, web activity related to media content, and TV viewing. The unified history may also cover emails received by the user referring to videos the user's selection of a link to a video in an email received by the user, and/or videos consumed from within an email application.

Figure 4A:
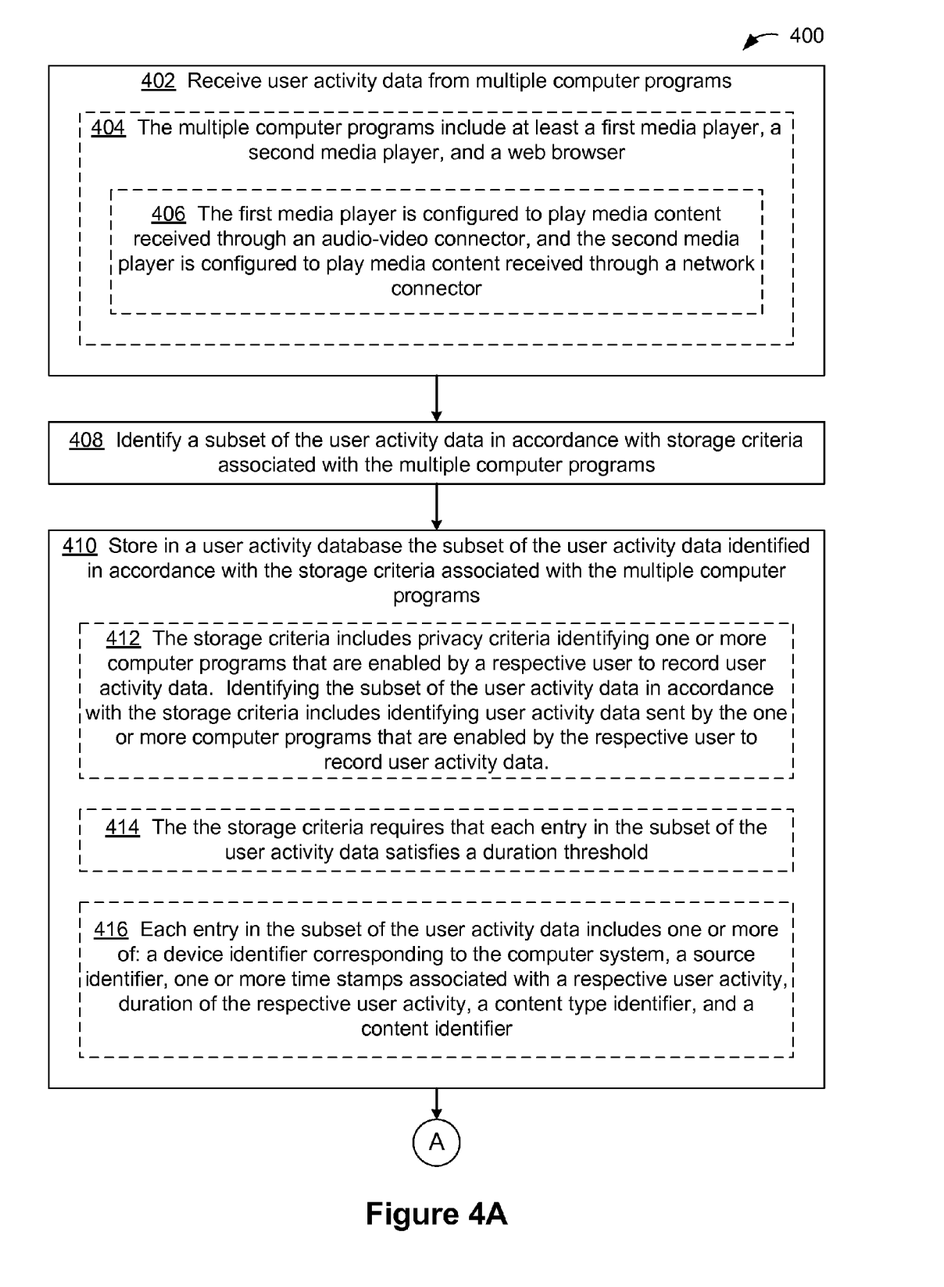
FIGS. 4A-4B are flowcharts representing a method for managing user activity data, in accordance with some implementations.
Figure 4B:
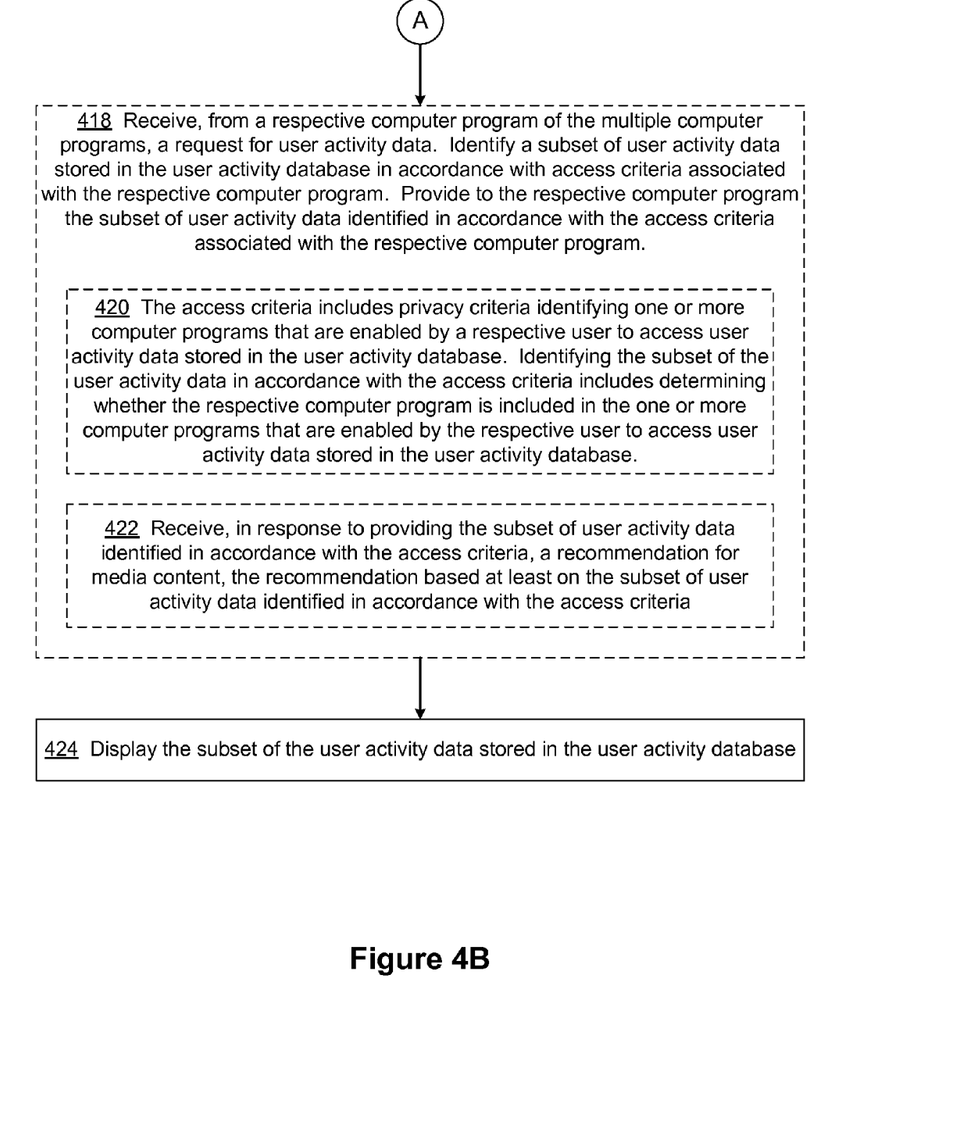

FIGS. 4A-4B are flowcharts representing a method 400 for managing user activity data in accordance with some implementations. The method 400 is performed at a computer system coupled with a television device. In some implementations, the method 400 is performed by a viewing history management module 218 (FIG. 2). For example, the computer system may be the companion device 114 coupled with a television screen 112 or a separate television device, or the computer system may be embedded in the integrated television device 116 (FIG. 1). Alternatively, the computer system may include the personal device 118. The computer system includes one or more processors and memory storing multiple computer programs, for execution by the one or more processors, for displaying content on the television device (e.g., the television player 220, the movie player 222, and the web browser 224, FIG. 2). As described above, in some implementations, the viewing history management module 218 (FIG. 2) is used to manage user activity data (e.g., the user activity database 228) stored in the computer system.

The system receives (402) user activity data from the multiple computer programs. For example, the system may receive user activity data from the television player 220 (FIG. 2) including information about the media content that the user is viewing. The system may also receive user activity data from the movie player 222 and/or the web browser 224.

In some implementations, the multiple computer programs include (404) at least a first media player (e.g., the television player 220), a second media player (e.g., the movie player 222), and a web browser (e.g., the web browser 224, FIG. 2).

In some implementations, the first media player is configured (406) to play media content received through an audio-video connector, and the second media player is configured to play media content received through a network connector. For example, the television player 220 may be configured to play television programs received through a high-definition multimedia interface (HDMI) or a similar audio/video interface for transmitting multimedia data. A TV signal device (e.g., a cable converter box) providing the HDMI or similar audio/video signals to the system may be configured to provide information identifying a channel that corresponds to the HDMI or audio/video signals received by the system. Thus, the system may be configured to receive information identifying the channel that corresponds to the received HDMI or audio/video signals from the TV signal device. The movie player 222 may be configured to play online streaming data received via an Ethernet connection. In some cases, the first media player is a television player, and the second media player is an online movie player.

The system identifies (408) a subset of the user activity data in accordance with storage criteria associated with the multiple computer programs. For example, the system identifies, from the user activity data received from the multiple computer programs, user activity data that satisfy the storage criteria (e.g., the storage criteria 230, FIG. 2). In some implementations, the system identifies user activity data that satisfy both the global criteria 302 and the application-specific criteria 304 (FIG. 3A) in the storage criteria 230. In some implementations, the system identifies a respective application providing the user activity data, and compares the received user activity data with an application criteria 306 corresponding to the respective application. In some implementations, the system identifies user activity data that satisfy the application-specific storage rights 308, the media type 316, the media content type 318, and the user activity type 320.

The system stores (410) in a user activity database (e.g., the user activity database 228, FIG. 2) the subset of the user activity data identified in accordance with the storage criteria associated with the multiple computer programs.

In some implementations, the storage criteria include (412) privacy criteria identifying one or more computer programs that are enabled by a respective user to record user activity data (e.g., the application-specific criteria 304, and in particular, the storage rights 308 in each application criteria 306, FIG. 3A). Identifying the subset of the user activity data in accordance with the storage criteria includes identifying user activity data sent by the one or more computer programs that are enabled by the respective user to record user activity data (e.g., satisfying all applicable criteria in the storage criteria 230).

In some implementations, the storage criteria require (414) that each entry in the subset of the user activity data satisfies a duration threshold (e.g., the minimum duration 312 and/or the maximum duration 314, FIG. 3A).

In some implementations, each entry in the subset of the user activity data includes (416) one or more of: a device identifier corresponding to the computer system (e.g., the device ID 354, FIG. 3C), a source identifier (e.g., the source identifier 358), one or more time stamps associated with a respective user activity (e.g., the start time 364 and/or the end time), duration of the respective user activity (e.g., the duration in the data field 366), a content type identifier (e.g., the content type identifier 362), and a content identifier (e.g., the content identifier 360). The content type identifier and/or the content identifier may be used to identify content currently being watched by the user so that related information may be provided to the user. The time stamp and/or the duration may be used to perform maintenance operations (e.g., data cleanup, defragmenting, etc.). The duration of the respective user activity may be used to remove entries corresponding to channel-surfing activities by the user.

In some implementations, the system receives (418), from a respective computer program of the multiple computer programs, a request for user activity data. For example, an application 122 (e.g., the television player 220, the movie player 222, or the web browser 224) may request user activity data in order to provide personalized services (e.g., personalized recommendations of television programs, music, movies, blogs, etc., or personalized searches based on the user activity data). The system identifies a subset of user activity data stored in the user activity database in accordance with access criteria associated with the respective computer program. For example, the system may identify user activity data that satisfy the access criteria 232 (FIG. 2). In some implementations, the system identifies a respective application requesting the user activity data, and compares user activity data stored in the user activity database (e.g., the user activity database 228) with an application criteria 326 corresponding to the respective application. In some implementations, the system identifies user activity data that satisfy the application-specific access rights 328, the media type 336, the media content type 338, and the user activity type 340. Additionally, the system may identify user activity data that correspond to a predefined time period (e.g., past seven days). The system provides to the respective computer program the subset of user activity data identified in accordance with the access criteria associated with the respective computer program. In some implementations, the respective computer program provides personalized recommendations based on the user activity data provided by the system.

In some implementations, the access criteria include (420) privacy criteria identifying one or more computer programs that are enabled by a respective user to access user activity data stored in the user activity database (e.g., the application-specific criteria 324, and in particular, the access rights 328 in each application criteria 326, FIG. 3B). Identifying the subset of the user activity data in accordance with the access criteria includes determining whether the respective computer program is included in the one or more computer programs that are enabled by the respective user to access user activity data stored in the user activity database (e.g., satisfying all applicable criteria in the access criteria 232, FIG. 2).

In some implementations, the system receives (422), in response to providing the subset of user activity data identified in accordance with the access criteria, a recommendation for media content, the recommendation based at least on the subset of user activity data identified in accordance with the access criteria. For example, the recommendation may include television programs, movies, music, and/or websites that are related to other television programs, movies, music, and/or websites the user has viewed, listened to, or visited (e.g., a latest episode of a television program that the user has viewed, a movie that stars the same actor/actress as another movie that the user has recently viewed, etc.).

The system displays (424) the subset of the user activity data stored in the user activity database. For example, the system may display the subset of the user activity data on the television screen 112 thereby enabling a user to view all of their unified history and repeat an action from that history.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

It will be understood that, although the terms first, second, etc. have been used herein to describe various elements, these elements should not be limited by these terms. These terms are only used to distinguish one element from another. For example, a first media player could be termed a second media player, and, similarly, a second media player could be termed a first media player. The first media player and the second media player are both media players, but they are not the same media player.

The terminology used in the description of the implementations herein is for the purpose of describing particular implementations only and is not intended to be limiting of the claims. As used in the description of the implementations and the appended claims and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting (the stated condition or event)" or "in response to detecting (the stated condition or event)," depending on the context.

What is claimed is:

1. A method, comprising:
   at a computer system coupled with a display device, the computer system including one or more processors and memory storing multiple distinct media content viewing applications including a first media content viewing application and a second media content viewing application distinct from the first media content view application, for displaying media content on the display device,
   obtaining a combined media content viewing history combining viewing histories from the multiple distinct media content viewing applications;
   providing access to the combined media content viewing history to a proper subset of the multiple distinct media content viewing applications according to application-specific criteria that indicate whether each of the multiple distinct media content viewing applications is authorized to access the combined media content viewing history, wherein the proper subset of the multiple distinct media content viewing applications include the first media content viewing application; and
   enabling, using the combined media content viewing history, a user of the computer system to play, in the first media content viewing application, a media content item consumed or being consumed using the second media content viewing application.

2. The method of claim 1, wherein the respective media content viewing application is associated with privacy criteria that specify whether the respective media content viewing application is enabled by a user to record media content viewing history on the respective media content viewing application, and the combined media content viewing history is obtained in accordance with the privacy criteria associated with the respective media content view application in the multiple distinct media content viewing applications.

3. The method of claim 1, wherein the multiple distinct media content viewing applications include at least a first media player, a second media player, and a web browser.

4. The method of claim 3, wherein the first media player is configured to play media content received through an audio-video connector, and the second media player is configured to play media content received through a network connector.

5. The method of claim 1, wherein each entry in the combined media content viewing history satisfies a duration threshold.

6. The method of claim 1, wherein each entry in the combined media content viewing history includes one or more of: a device identifier corresponding to the computer system, a source identifier, one or more time stamps associated with a respective media content viewing activity, duration of the respective media content viewing activity, a content type identifier, and a content identifier.

7. The method of claim 1, further comprising:
   receiving, from a media content viewing application in the multiple distinct media content viewing applications, a request for the combined media content viewing history;
   identifying a proper subset of the combined media content viewing history in accordance with access criteria associated with the media content viewing application; and
   providing, to the media content viewing application, the proper subset of the combined media content viewing history.

8. The method of claim 1, further comprising:
   providing, in the first media content viewing application, a recommendation for media content, the recommendation based at least on the media content item consumed or being consumed using the second media content viewing application.

9. The method of claim 1, further comprising:
   formatting for display, in the first media content viewing application, the combined media content viewing history.

10. A computer system coupled with a display device, the computer system comprising:
    one or more processors;
    memory storing multiple distinct media content viewing applications including a first media content viewing application and a second media content viewing application distinct from the first media content view application, for execution by the one or more processors, for displaying content on the display device, the memory including instructions for:
    obtaining a combined media content viewing history combining viewing histories from the multiple distinct media content viewing applications;
    providing access to the combined media content viewing history to a proper subset of the multiple distinct media content viewing applications according to application-specific criteria that indicate whether each of the multiple distinct media content viewing applications is authorized to access the combined media content viewing history, wherein the proper subset of the multiple distinct media content viewing applications include the first media content viewing application; and
    enabling, using the combined media content viewing history, a user of the computer system to play, in the first media content viewing application, a media content item consumed or being consumed using the second media content viewing application.

11. The computer system of claim 10, the respective media content viewing application is associated with privacy criteria that specify whether the respective media content viewing application is enabled by a user to record media content viewing history on the respective media content viewing application, and the combined media content viewing history is obtained in accordance with the privacy criteria associated with the respective media content view application in the multiple distinct media content viewing applications.

12. The computer system of claim 10, wherein the multiple distinct media content viewing applications include at least a first media player, a second media player, and a web browser.

13. The computer system of claim 12, wherein the first media player is configured to play media content received through an audio-video connector, and the second media player is configured to play media content received through a network connector.

14. The computer system of claim 10, wherein each entry in the combined media content viewing history satisfies a duration threshold.

15. The computer system of claim 10, wherein each entry in the media content viewing history includes one or more of: a device identifier corresponding to the computer system, a source identifier, one or more time stamps associated with a respective media content viewing, duration of the respective media content viewing, a content type identifier, and a content identifier.

16. A non-transitory computer readable storage medium storing multiple distinct media content viewing applications including a first media content viewing application and a second media content viewing application distinct from the first media content view application, for execution by one or more processors of a computer system coupled with a display device, for displaying media content on the display device, the non-transitory computer readable storage medium including instructions for:
   obtaining a combined media content viewing history combining viewing histories from the multiple distinct media content viewing applications;
   providing access to the combined media content viewing history to a proper subset of the multiple distinct media content viewing applications according to application-specific criteria that indicate whether each of the multiple distinct media content viewing applications is authorized to access the combined media content viewing history, wherein the proper subset of the multiple distinct media content viewing applications include the first media content viewing application; and
   enabling, using the combined media content viewing history, a user of the computer system to play, in the first media content viewing application, a media content item consumed or being consumed using the second media content viewing application.

17. The non-transitory computer readable storage medium of claim 16, wherein the respective media content viewing application is associated with privacy criteria that specify whether the respective media content viewing application is enabled by a user to record media content viewing history on the respective media content viewing application, and the combined media content viewing history is obtained in accordance with the privacy criteria associated with the respective media content view application in the multiple distinct media content viewing applications.

18. The non-transitory computer readable storage medium of claim 16, wherein the multiple distinct media content viewing applications include at least a first media player, a second media player, and a web browser.

19. The non-transitory computer readable storage medium of claim 18, wherein the first media player is configured to play media content received through an audio-video connector, and the second media player is configured to play media content received through a network connector.

20. The non-transitory computer readable storage medium of claim 16, wherein each entry in the combined media content viewing history satisfies a duration threshold.

* * * * *